May 5, 1964   N. CORDIS   3,131,707
PROPORTIONING MEDICATOR FOR WATERERS
Filed Aug. 26, 1957   3 Sheets-Sheet 1
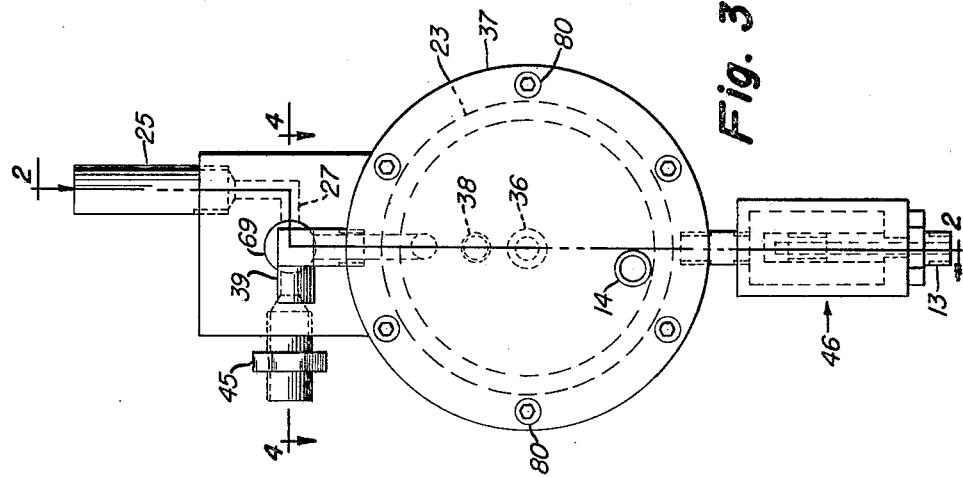
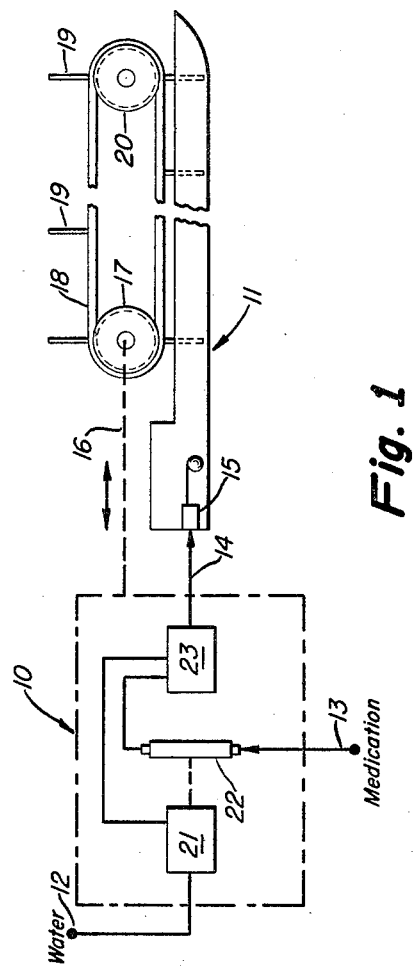

United States Patent Office 3,131,707
Patented May 5, 1964

3,131,707
PROPORTIONING MEDICATOR FOR WATERERS
Nat Cordis, Crown Stock Farms, Silver Lake, Wis.
Filed Aug. 26, 1957, Ser. No. 680,250
3 Claims. (Cl. 137—99)

This invention relates to fluid proportioning apparatus for mixing a treating fluid with a flowing raw fluid under pressure. More particular the invention relates to a system for medicating the drinking water of live stock, including poultry.

Many types of equipment have heretofore been proposed for feeding one fluid, including drugs, vaccines, nutrients, sanitizing materials and the like into a second fluid stream such as water. The prior systems, however, have been complicated in construction, unreliable in operation, cumbersome in use, and not adapted for both portable and automatic continuous installations.

For these and other reasons it has heretofore been necessary to pre-mix the bulk fluids in auxiliary tanks and then to pump the mixture from the tanks to the distribution point such as a watering trough. It has also been necessary to carefully proportion the treating fluid in batch operations which is a messy, wasteful, time-consuming, and unsatisfactory operation even when done by skilled persons.

It is therefore a primary object of the present invention to provide new and novel apparatus for continuously and automatically treating raw water with a fluid treating agent. A further object of the invention is to provide a system for feeding a first fluid into a second fluid in controlled proportions over a wide range of pressures and flow rates of the second fluid. An additional object of the invention is to provide an inexpensive and reliable device which is portable and rugged. Another object of the invention is to provide a system which requires no power other than the flowing stream to be treated for operating the apparatus. It is also an object of the invention to provide an apparatus particularly adapted for use in medicating the drinking water of poultry and for delivering the treated water under line pressure into the water distribution system, such as a system of drinking troughs having float-controlled inlet valves.

A more specific object of the invention is to provide such a water-powered proportioning system which is controlled by the float-controlled inlet valve of the watering trough. A further object of the invention is to provide an apparatus which is adapted to perform the proportioning functions and in addition supply a useful oscillating force which may be applied, for example, to the driving of endless conveyors in feeding and/or watering troughs. These and other objects of the invention will become apparent as my description thereof proceeds.

Briefly, according to my invention I provide a water motor, a slave pump driven by such motor, and a mixing chamber into which the fluid used to operate the motor are commingled with the treating fluid supplied by the slave pump. Novel metering and check valve means are provided on the slave pump which is operated by a connecting rod between the pump and an oscillating piston in the water motor. The mixed treating agent and water are discharged from the mixing chamber under pressure into a distribution line controlled by suitable valve means which operates to control the water motor and hence the slave pump.

Details and advantages of the invention will be described by reference to the accompanying drawings wherein:

FIGURE 1 is a schematic diagram illustrating one embodiment of the system;

FIGURE 3 is a plan view of the apparatus in FIGURE 2, shown partly in section.

Figure 2:
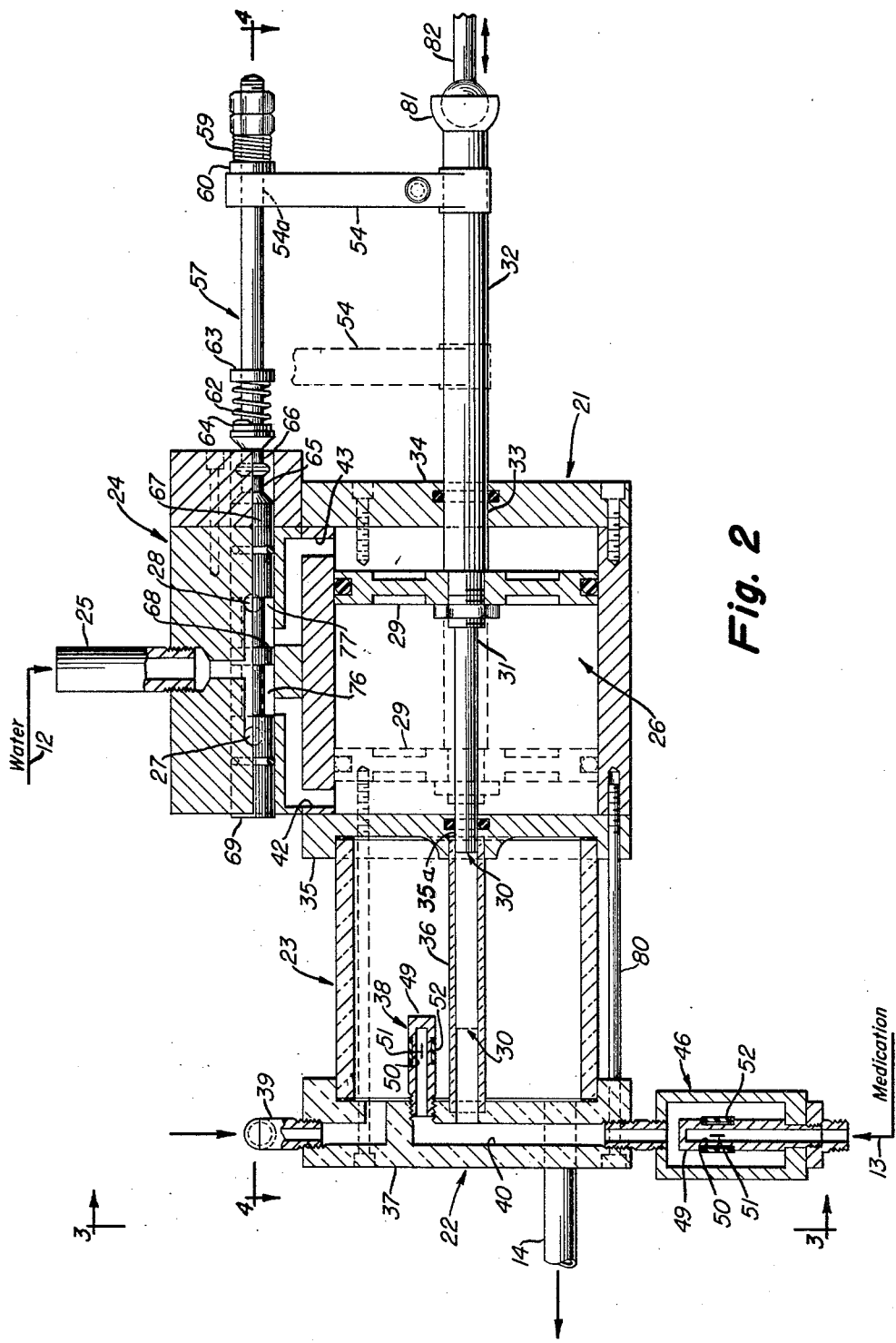
FIGURE 2 is an elevation in section of my apparatus.

Referring to FIGURE 1, the apparatus illustrated schematically includes the motor-pump unit 10, the waterer trough 11, water inlet line 12, medication inlet line 13, treated fluid discharge line 14, discharging into the float chamber 15 of trough 11; and linkage 16 (81, 82 in FIGURE 2) operating between the unit 10 and the pulley 17 about which the conveyor 18 travels with its paddles 19 passing along the trough 11. The conveyor 18 passes around the pulley 20 and repeats the cycle. If desired, this pulley, conveyor, paddle system may be operated in a feeder trough (not shown) and in some instances the paddles 19 may be omitted, the conveyor 18 itself performing the functions of moving the feed in a feeder trough or of removing litter from a waterer 11.

Figure 4:
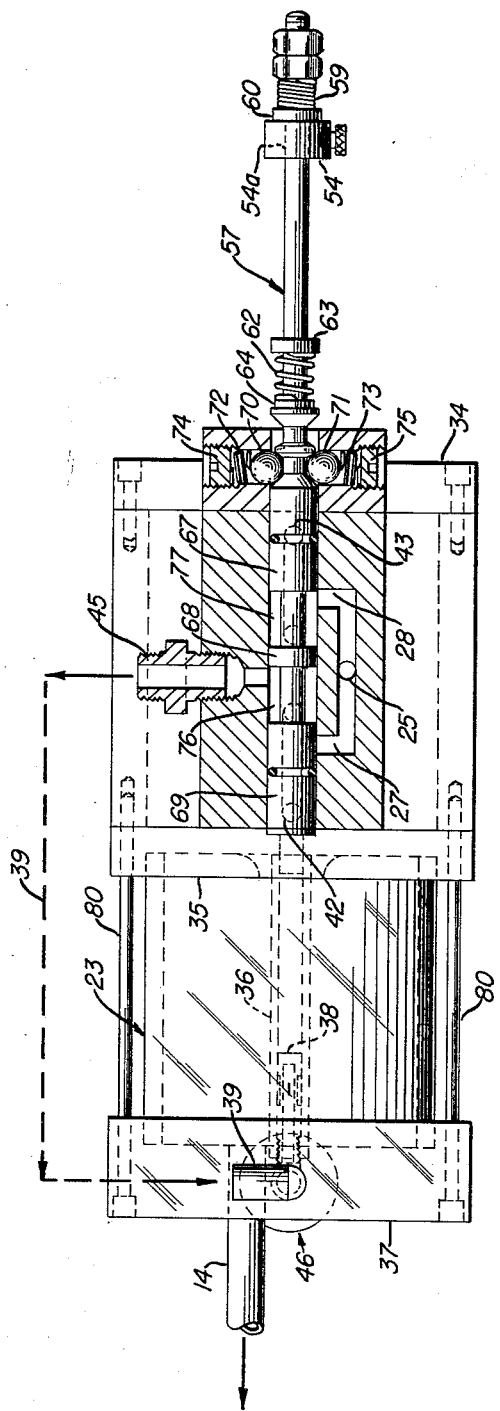
FIGURE 4 is an end view, taken along the line 4—4 in FIGURE 2.

In FIGURES 2, 3, and 4, I show details of the water motor 21, the slave pump 22, and mixing chamber 23 which together comprise the unit 10 in FIGURE 1. The water enters valve chamber 24 through line 25 and is gated into the motor body 26 via ports 27 or 28 to apply fluid pressure on alternate sides of the motor piston 29 via channel 42 or 43. A slave pump piston 30 comprises a rod 31 carried by the face of the piston 29 which in turn is fixed to connecting rod 32 passing through port 33, sealed by the O-ring gasket 33a, in the end wall 34 of the motor body 26. The pump piston 30 slidably extends through the opposite wall 35 of the motor body 26 through the bore 35a provided with the O-ring gasket, the end wall 35 also being an end wall of the mixing chamber 23.

Projecting through the mixing chamber 23 is the pump cylinder 36 fixed to the end wall 35 and to the end plate 37 which contains the check valve assembly 38 and the water inlet connection 39. A bore 40 in the end plate 37 communicates with the pump cylinder 36 within which the pump piston 30 operates to-and-fro in response to the movement of the motor piston 29. The piston 29 is driven by the water entering the gating system 24 and expelled by the piston 29 through channel 42 or 43 into the line 45 which delivers the spent water to the connection 39 comprising the inlet in the mixing chamber 23.

When the pump piston 30 moves within the pump cylinder 36 away from the pumping bore 40 in the end plate 37, treating fluid is drawn into the pump through the "open" inlet check valve 46 and at the same time the suction produced by the withdrawal of the pump piston 30 in cylinder 36 closes the outlet check valve 38, which when subsequently opened discharges into the mixing chamber 23. When the direction of travel of the pumping piston 30 is reversed in following the motion of the motor piston 29 through the rigid connecting rod 32, the inlet check valve 46 closes and the outlet check valve 38 opens so that the treating fluid trapped in the pumping cylinder 36 is ejected under pressure into the mixing chamber 23. The water and medication which enter the mixing chamber 23 in each cycle is in a fixed proportion based upon the displacement volume of the pumping piston 30 and the volume of the motor chamber 26 on either side of the motor piston 29. If desired, a multiplicity of check valve-pump assemblies 38, 40, 46, 36, and 30 may be provided within mixing chamber 23 and actuated by the water motor 21. In this several types of treating agents or additives may be blended with the water at the same time.

Each of the check valves 38 and 46 comprises a tubular dead-ended member 49, a peripheral recess 50 about the outer wall of the member 49, a port 51 communicating with the recess 50, and an elastic sleeve or tubular port closure 52 within the recess 50 and covering the port 51. When a pressure differential is established from the inside-out, the sleeve 52 expands to permit the fluid within the tubular member 49 to flow through the port 51; when the pressure differential is such as to cause the sleeve 52 to collapse over the port 51, no flow occurs. Thus on a suction stroke of the pumping piston 30, the sleeve 52 on inlet check valve 46 expands to open the port 51; and the sleeve 52 on the outlet check valve 38 collapses to close the port 51. When the pumping piston 30 is on the ejection stroke, this situation is reversed so that the sleeve 52 on the outlet check valve 38 discharging into the mixing chamber 23 is expanded to open the port 51 and the sleeve 52 on inlet check valve 46 is collapsed to close the port 51 leading to the medication inlet line 13.

To control the gating of the driving water into the motor 21, I provide the connecting rod 32 which extends through the end wall 34 of the motor body 26. An arm 53 fixed to the rod 32 extends upwardly about the tappet or valve control 57 which slidably extends into the valve chamber 24. The end of the arm 57 has a first bumper spring 59 with a follower washer 60 between the end of the spring 59 and the arm 54 which is provided with a bore 54a through which the arm 57 may slide. The portion of the arm 57 adjacent the end of the valve chamber 24 is provided with a second bumper spring 62 and washer 63, the spring 62 abutting the shoulder 64 on the arm 57. The reset stops 65 and 66 are spaced a distance representing the net travel of the plugs 67, 68, and 69 on each stroke of the motor piston 29.

A pair of balls 70 and 71 on opposite sides of the arm 57 are each provided with springs 72 and 73 within adjustable caps 74 and 75 for pressing the balls 70 and 71 into the reset stops 65 and 66 on arm 57 thereby securing the arm 57 at the limits of its stroke. A universal joint 81 and shaft 82 on the end of rod 32 actuates the linkage 16 of FIGURE 1.

The gating system within the valve chamber 24 includes the three plugs 67, 68, and 69 on the arm 57 with the recesses or valve ports 76 and 77 which can be brought into register with the appropriate channel inlets and the motor cylinder outlets to permit flow into and through the valving chamber 24, the motor body 26 on alternate sides of the piston 29, and ultimately out line 45 and connection 39 into the mixing chamber 23.

As the piston 29 reciprocates within the motor body 26, the connecting rod 32 carrying the arm 54 moves the arm 57 from one extreme position to the other, shifting the reset stops 65 and 66 over the balls 70 and 71 until the arm 54 compresses springs 59 or 62 which thereafter rapidly expand to reverse the direction of travel of the arm 57 and hence of the connecting rod 32 and the piston 29. The alternate inlet channel is opened and the water flows through the gating system behind the piston 29 to drive it to the other end of the motor cylinder 26.

Upon reaching the remote end of the cylinder 26, the other spring 62 is compressed after the stop 70 has shifted and when the water pressure is momentarily diverted by the valving system, the spring 62 uncoils and reverses the direction of travel of the motor piston 29. This action of the motor piston 29, does of course reverse the travel of the pumping piston 30 from a suction stroke to an ejection stroke as described above.

In the illustrated embodiment of the invention, the end plate 37, and the end walls 34 and 35 are secured to the cylindrical mixing chamber 23 and to the motor body 26 by tie rods 80, or the like, where needed but it will be apparent that other securing means such as screw caps and bolted flanges may be used.

It will be understood that suitable materials of construction will be selected. For example with corrosive treating agents I may use a nylon pumping piston 30 in a glass or stainless steel cylinder 36. The end plate 37 and the check valve assemblies 38 and 46 may be of plastic or stainless steel. Other metals provided with ceramic or plastic coatings also may be used.

Although I have described my invention with particular reference to preferred embodiments thereof, it should be understood that this is by way of illustration only and that modifications therein may be made in view of my teaching without departing from the spirit and scope of the invention.

What I claim is:

1. Proportioning apparatus comprising a pressure operated hydraulic motor, said motor including a connecting rod, conduit means for delivering a first liquid under pressure to said motor, control valve means gating said liquid to said motor, second conduit means for discharging liquid from said motor, reciprocating piston pump means driven by said motor, first check valve means metering flow of a second liquid into said pump means, second check valve means controlling flow from said pump means, tappet means reciprocated by said motor pump means, said tappet means actuating said control valve means, said tappet means alternately projecting said control valve means into alternate positions, mixing chamber means into which said second conduit means and said second check valve means discharge, delivery means for withdrawing the mixed first and second liquids from said mixing chamber means, and the reciprocating pump means comprises a pumping cylinder arranged axially within said mixing chamber and within which an extension of said connecting rod comprises the pumping piston.

2. A fluid proportioning device comprising a master hydraulic motor means, slave pump means actuated by said motor means, a first piston in said motor means, a second piston in said pump means and of substantially smaller displacement than said first piston, rigid connecting rod means between said first and second piston means, first valve means for gating a first fluid through said motor means, restraining means for said valve means, paired check valve means for gating a second fluid through said pump, a blending chamber supported by said motor means and into which said fluids flow, tappet means reciprocated by said first piston means, said tappet means actuating said first valve means, a pair of coil spring means embracing said tappet means and alternately projecting said valve means into alternate positions when contacted by said tappet means, said second piston and slave pump means being disposed axially within said blending chamber, and discharge conduit means from said blending chamber for delivery of the proportioned mixture of fluids.

3. A fluid blending and proportioning device which comprises a first cylinder, a piston operable in said first cylinder, a second cylinder axially aligned with the first cylinder, a second piston in said second cylinder, a rigid connection between said pistons so that they reciprocate in unison, a pumping barrel in communication with said second cylinder intermediate the ends of said barrel, check valve means at inlet and outlet ends of said barrel, mixing tank means enclosing said second cylinder and supporting said pumping barrel and said check valve means, control valve means gating the first fluid into said first cylinder alternately on opposite sides of said first piston, and tappet means controlled by said first piston to actuate said control valve said tappet means including an axial extension of said control valve slidably extending through a portion of said tappet means, a pair of coil springs embracing said portion of said tappet means and carried by said axial extension, said springs alternately being compressed by the reciprocation of said tappet means and projecting said control valve to a new position.

References Cited in the file of this patent

UNITED STATES PATENTS

| | | |
|---|---|---|
| 1,734,368 | Cumner | Nov. 5, 1929 |
| 1,870,897 | Davis | Aug. 9, 1932 |
| 2,105,078 | Hill | Jan. 11, 1938 |
| 2,203,832 | Malburg | June 11, 1940 |
| 2,570,694 | Langenbahn | Oct. 9, 1951 |
| 2,734,636 | Foster | Feb. 14, 1956 |